Figure 1:
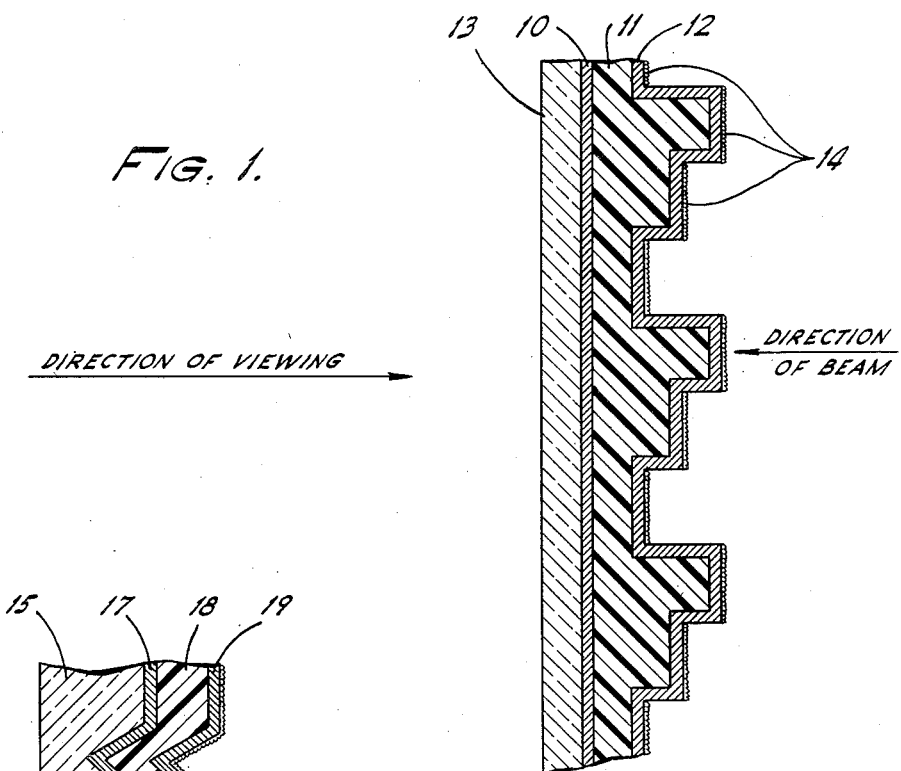

Oct. 30, 1956

M. SADOWSKY 2,769,111

OPTICAL SYSTEM

Filed July 25, 1951

INVENTOR.
MEIER SADOWSKY
BY
Allen V. Hazeltine
ATTORNEY

United States Patent Office 2,769,111
Patented Oct. 30, 1956

2,769,111

OPTICAL SYSTEM

Meier Sadowsky, Elkins Park, Pa., assignor to Philco Corporation, Philadelphia, Pa., a corporation of Pennsylvania Application July 25, 1951, Serial No. 238,527

4 Claims. (Cl. 313—92)

The present invention relates broadly to optical color filters and, more particularly, to color filters having small discrete elements transmissive of light of different colors.

Filters of this general nature have assumed considerable importance in connection with color television apparatus where it has been proposed to form an image in full color by suitably illuminating closely spaced minute filter elements, aranged in groups of three, the elements of each group being transmissive of red, green and blue light, respectively. When the light transmitted by such a filter is viewed from a distance at which the human eye is unable to resolve the individual filter elements, the light from the different elements will appear to blend and the impression of a properly colored image will be created.

It is now apparent that such filters must be made up of extremely small elements so as to be beyond the resolving power of the human eye at the short television viewing distances commonly encountered in the home.

In addition, it is ordinarily preferred to incorporate such filters directly into the cathode ray tube of a television receiver so as to avoid serious problems of optical registry between the phosphor screen of the tube, which serves as light source for the filter, and the individual minute filter elements.

From both of these aspects, prior art filters made of vari-colored organic pigments left room for improvement, first because it proved somewhat difficult to form accurate deposits of such substances in the minute quantities involved and secondly because the coloration of thesee organic substances tended to undergo undesirable modifications under tube processing conditions of heat and pressure reduction.

Accordingly it is a primary object of my invention to provide an improved optical filter comprising minute discrete elements transmissive of light of different colors.

Another object of my invention is to provide an optical color filter comprising a plurality of portions transmissive of light of different colors in which the color of the light transmitted is essentially independent of the internal structure and composition of the materials forming the filter and is primarily dependent on their external dimensions and configuration.

It is still another object to provide a color filter suitable for incorporation in a cathode ray tube.

It is a still further object of the invention to provide a color filter having minute elements transmissive of light of different colors and of an ease of construction heretofore unapproached.

A filter constructed in accordance with my invention is a composite structure which consists of two surface layers, each made of a material which is partly reflective and partly transmissive of light, and having sandwiched between them a spacing layer of transparent material with which the confronting faces of the surface layers are everywhere in contact. The spacing between these confronting faces of the surface layers determines the color of light transmitted by any region of the composite filter structure. In accordance with the invention, elements of the filter structure which are to transmit light of different colors are provided with spacing layers of different thickness.

Figure 2:
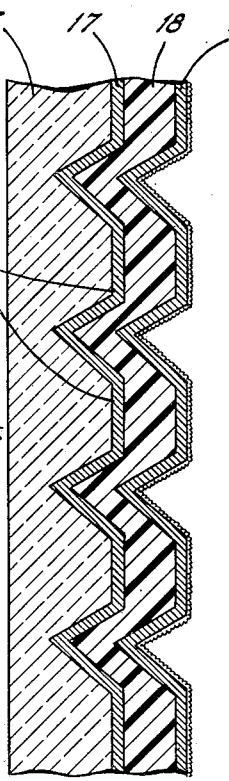

The manner in which the objects of the invention are realized will be understood from the discussion to follow, when considered in conjunction with the accompanying drawings, wherein:

Figure 1 shows one embodiment of my invention; and
Figure 2 shows a preferred embodiment of my invention.

There is shown in Figure 1, to which more particular reference may now be had, a sectional side view of a greatly enlarged fragment of a filter constructed according to the invention.

This filter includes a flat surface layer 10, made of a film of highly reflective material, the film being so thin as to be partly transparent. It is apparent that a variety of substances, particularly metals which are highly reflective even in extremely thin layers, will serve to form such a film. In addition, it is preferable to choose a substance which does not selectively attenuate light of certain colors with respect to light of other colors. In other words, the surface film has, for best results, a relatively flat spectral transmission characteristic. A substance which meets these various requirements is silver and silver has, in fact, been used in practical filters of this kind. Aluminum and a variety of other metals will also serve.

Next to and in contact with the surface layer 10, there is a spacing layer 11, made of a transparent material whose thickness, measured in a direction normal to the plane of surface layer 10, varies in three cyclically recurrent steps. The principal characteristics of the material of this spacing layer must be: transparency to light of substantially all colors, low internal reflectivity, ease of formation into layers of closely controlled thickness, and stability under conditions of cathode ray tube manufacture. While by no means the only ones which have the requisite properties, the two materials most frequently employed in such spacing layers are magnesium fluoride and zinc sulfide. Others are glass, transparent plastics, and the like.

Finally, there is formed, on the stepped surface of spacing layer 11, another surface layer 12 which may be made of a thin silver film just like layer 10.

The entire sandwich-like filter structure consisting of surface layers 10 and 12, separated by spacing layer 11, may be mechanically supported by a rigid and transparent substrate such as glass plate 13. In fact, the actual construction of such a filter is often carried out by first evaporatively depositing the necessary silver surface film 10 directly on the glass plate 13. The spacing layer is then formed on top of the silver layer by evaporative deposition of the spacing material, the stepped configuration being obtained by first covering the entire area with a thickness of spacing material corresponding to that of the lowest step, then masking the portions which are to remain at that level and depositing enough material to form the second step, and finally masking the lowest and intermediate step portions and building up the spacing material to the thickness of the highest step. The process is concluded by depositing another surface layer of silver, this time on the entire exposed stepped surface of the filter. Note that evaporative deposition of the filter materials is particularly convenient both because it is an easy way of obtaining the extremely thin layers required and because it permits accurate control of the thickness of these layers.

The filter herein depicted derives its color selectivity characteristics from well known principles of so-called light "interference," this being a phenomenon whereby light admitted to the spacing layer of the sandwich is reflected back and forth between the confronting faces of the two surface layers. If, after such multiple reflections, certain light waves arrive in phase at the surface layer opposite to that through which they entered, they are transmitted therethrough. Others, which arrive out of phase, are cancelled and not transmitted. Thus, by proper selection of the thickness of the spacing layer 11, the filter may be made transmissive of light of one particular wavelength, or, at any rate, of only a very narrow range of wavelengths.

In its application to color television, the spacing layer 11 will ordinarily be made in three different thicknesses, as shown, proportioned so as to transmit red, green and blue light, respectively. The actual proportioning, in any particular case will, of course, depend upon the exact materials utilized to form the three layers, their choice being by no means limited to silver and magnesium fluoride. Furthermore, the thickness of the spacing layer will be determined by the exact shade of red, green, and blue which is deemed to give good subjective results from the point of view of the observer. In determining the thickness which the spacing layer should have to produce a filter element transmissive of a narrow range of colors centered about a single color of wavelength $\lambda$, the following equation may be used as a rough guide:

$$d \approx \frac{2n+1}{2}\lambda$$

where $d$ is the thickness of the spacing layer and $n$ is zero or any positive integer. This formula indicates that the thickness of the spacing layer should be approximately equal to an odd number of half wavelengths of light of whatever color it is desired to transmit.

Note, in this connection, that the color of the light transmitted by the filter elements of my invention depends upon the direction from which these elements are viewed. Thus, if it is contemplated that the filter will be viewed from a direction normal to the flat surface layer 10, then the color determinative thickness of the different elements must be measured in that same direction. Having determined the proper thicknesses on that basis, a change in the viewing direction will also produce a change in the color of the light observed as coming from each of the filter elements, since the observed light now follows slanting paths of changed lengths through the spacing layer 11.

In practice, the filter may be incorporated into the tube screen structure itself. In that case the substrate 13 will be the glass face plate of a cathode-ray tube, the filter sandwich being placed on the electron beam confronting side of the face plate. Furthermore, the phosphor which forms the light-emissive portion of the cathode-ray tube screen is then directly deposited on the stepped surface layer 12 of the filter, as shown at 14 in Figure 1. Electron beam impinged portions of this phosphor will then serve as light sources for observation through the immediately adjacent element of the filter.

It has been pointed out, hereinbefore, that the thickness of the spacing layer of my filter is particularly significant in relation to the viewing direction. This aspect of the arrangement is taken advantage of in the preferred embodiment shown in Figure 2 to which more particular reference may now be had.

There the direction of viewing may again be assumed to be normal to the general plane of the glass substrate 15 on which the actual filter is formed. Instead of placing all the surfaces of the filter sandwich in parallel planes and varying the thickness of the spacing layer in a direction normal to these planes, as was done in the embodiment of Figure 1, the different segments of the filter sandwich are now all made of the same thickness, measured in a direction normal to any of its surfaces. The change, from one segment to another, in path length of light traversing the layers in the viewing direction is then effected by placing different segments at different angles with respect to this direction.

For this purpose, that side of substrate 15 upon which the filter is to be formed may be constructed so as to have narrow strip-like regions 16 disposed in planes normal to the direction of viewing, each such region 16 being flanked by a pair of strip-like regions whose planes are inclined with respect to this normal plane and with respect to each other. A reflective surface layer 17 is then deposited directly on the substrate 15 and following its contour. On top of this comes a spacing layer 18, which may now be of uniform thickness over the entire filter area, followed by the second surface layer 19. Again the particular spacing layer thickness required to give transmission of particular light colors will have to be related to the wavelengths of these colors. In practice, the thickness of the spacing layer superposed on a region 16 of the substrate 15 may first be determined so as to transmit light of one color, red for example, in the direction of viewing. For this purpose, the equation hereinbefore set forth in connection with Figure 1 may be used. It is then a simple matter to determine the inclination of the adjacent regions necessary to yield transmission of green and blue light, respectively.

In this connection, I have determined experimentally that the filter segments adjacent a red light transmissive segment should be inclined with respect to the viewing direction at angles of 60° and 40° respectively, so as to produce blue and green light transmission, respectively, through the segments so inclined.

The particular merit of the arrangement of Figure 2 lies in the ease with which it can be manufactured. For, once the glass substrate has been molded or otherwise grooved so as to have surface regions inclined at the proper angles with respect to the desired viewing direction, then the two surface layers and the spacing layer can be formed by evaporative deposition as in Figure 1, except that now each of the three layers is of uniform thickness so that no masking will be required.

It will be understood that modifications of these structures will occur to those skilled in the art without departing from my inventive concept. Accordingly, I desire the latter to be limited only by the appended claims.

I claim:

1. A screen structure for a cathode ray tube, said screen structure comprising: a transparent substrate; a first surface layer of a partly transparent and partly reflective material deposited on one face of said substrate; a spacing layer of transparent material deposited on said first surface layer; a second surface layer of a partly transparent and partly reflective material deposited on said spacing layer; and a layer of material responsive to electron beam impingement to emit light which is a mixture of a plurality of primary color components deposited on said second surface layer, said spacing layer having a thickness measured in a predetermined direction which varies discontinuously over the face of said screen.

2. A screen structure for a cathode ray tube, said screen structure comprising: a transparent substrate layer; a first surface layer of a partly transparent and partly reflective material deposited on one face of said substrate; a spacing layer of transparent material deposited on said first surface layer; a second surface layer of a partly transparent and partly reflective material deposited on said spacing layer; and a layer of material responsive to electron beam impingement to emit light which is a mixture of a plurality of primary color components deposited on one of the remaining exposed faces of said layers, said spacing layer having a thickness measured in a predetermined direction which varies discontinuously over the face of said screen.

3. The screen structure of claim 2 further characterized in that said spacing layer thickness varies in predetermined steps occurring in a predetermined order, spacing layer portions of equal thickness recurring at every third step.

4. The screen structure of claim 2 further characterized in that said spacing layer is of uniform thickness measured in a direction normal to said surface layers, portions of said layers corresponding to said portions of different thickness of said spacing layer being inclined at different angles to said viewing direction.

References Cited in the file of this patent

UNITED STATES PATENTS

| | | |
|---|---|---|
| 2,446,440 | Swedlund | Aug. 3, 1948 |
| 2,472,991 | Sukumlyn | June 14, 1949 |
| 2,543,477 | Sziklai et al. | Feb. 27, 1951 |
| 2,544,690 | Koch et al. | Mar. 13, 1951 |
| 2,577,038 | Rose | Dec. 4, 1951 |
| 2,605,434 | Homrighous | July 29, 1952 |
| 2,660,684 | Parker | Nov. 24, 1953 |
| 2,687,670 | Locquin | Aug. 31, 1954 |

OTHER REFERENCES

Some Notes on a New Type of Filter, article by Kemp in the British Journal of Photography, June 17, 1949, p. 276.

Continuously Variable Interference Filters, article by Turner et al. in the Journal of the Optical Society of America, vol. 38, No. 7, July 1948, p. 662.

Reflection and Transmission Interference Filters, article by Hadley et al. in Journal of the Optical Society of America, vol. 37, No. 6, June 1947, pp. 451–465.